United States Patent [19]

Wideman

[11] 4,452,950

[45] Jun. 5, 1984

[54] PROCESS FOR HYDROGENATION OF CARBON-CARBON DOUBLE BONDS IN AN UNSATURATED POLYMER IN LATEX FORM

[75] Inventor: Lawson G. Wideman, Tallmadge, Ohio

[73] Assignee: The Goodyear Tire & Rubber Company, Akron, Ohio

[21] Appl. No.: 468,816

[22] Filed: Feb. 22, 1983

[51] Int. Cl.$^3$ ............................................. C08F 8/04
[52] U.S. Cl. ................................ 525/339; 525/329.3; 525/332.8; 525/332.9; 525/333.1; 525/333.2; 525/338
[58] Field of Search ............... 525/339, 338, 329.3, 525/332.8, 332.9, 333.1, 333.2

[56] References Cited

U.S. PATENT DOCUMENTS

| 2,414,578 | 1/1947 | Adelson et al. | 525/339 |
| 3,959,239 | 5/1976 | Butler et al. | 525/338 |
| 4,207,409 | 1/1980 | Ladeuberger et al. | 525/339 |
| 4,271,323 | 1/1981 | Durand et al. | 525/339 |

Primary Examiner—Joseph L. Schofer
Assistant Examiner—Bernard Lipman
Attorney, Agent, or Firm—D. O. Nickey

[57] ABSTRACT

There is disclosed a process for the hydrogenation of carbon-carbon double bonds of an unsaturated polymer which comprises (a) combining an unsaturated polymer in latex form with (1) an oxidant selected from the group consisting of oxygen, air and hydroperoxides; (2) a reducing agent selected from the group of hydrazine and hydrates thereof; and (3) a metal ion initiator; (b) heating the mixture to a temperature from 0° C. to the reflux temperature of the reaction mixture.

15 Claims, No Drawings

PROCESS FOR HYDROGENATION OF CARBON-CARBON DOUBLE BONDS IN AN UNSATURATED POLYMER IN LATEX FORM

TECHNICAL FIELD

This invention relates to a method for hydrogenating carbon-carbon double bonds of an unsaturated polymer. The process of this invention provides polymeric materials which have a greater resistance to oxidative degradation and a greater resistance to thermal degradation.

BACKGROUND ART

Certain catalysts are known to catalyze hydrogenation of the carbon-carbon double bonds of diene polymers. An unsaturated bond of a polymer is hydrogenated for the purpose of improving the properties of the polymer. If, however, the inherent properties of the polymer are degraded as a result of the hydrogenation, there is no significance in modifying the polymer by hydrogenation. For example, when modification of a styrene/butadiene random or block copolymer proceeds so far as to hydrogenate the benzene ring of styrene, the polymer will lose its rubber-like properties. In the case of an acrylonitrile/butadiene random or block copolymer, reduction of its nitrile group as a result of hydrogenation will markedly reduce the oil resistance of the copolymer. Accordingly, in so modifying a polymer it is necessary to selectively hydrogenate only the olefinic carbon-carbon double bonds.

Noble metals such as platinum and palladium are frequently used as catalysts in hydrogenation. Since these noble metals are expensive they are used in the smallest possible amounts when performing selective hydrogenations.

An article by H. J. Harwood et al, *Diimide as a Reagent for the Hydrogenation of Unsaturated Polymers*, Die Makromolekulare Chemie, 163, pages 1–12 (1973), discloses the hydrogenation of various butadiene polymers and of polyisoprene with diimide generated in situ from p-toluenesulfonylhydrazide. The best results were obtained when concentrated polymer solutions were heated with a five-fold excess of p-toluenesulfonylhydrazide.

An article by L. A. Mango and R. W. Lantz, *Hydrogenation of Unsaturated Polymers with Diimide*, Die Makromolekulare Chemie, 163, pages 13–36 (1973), discloses the homogeneous hydrogenation of a series of unsaturated polymeric substrates with diimide formed from a thermal decomposition of p-toluenesulfonylhydrazide at elevated temperatures (110° to 160° C.) in aromatic solvents.

U.S. Pat. No. 4,337,329, discloses a method for the catalytic hydrogenation of conjugated diene polymers wherein the improvement comprises using a catalyst composed of a porous powdery or granular carrier and supported thereon both palladium and at least one metal selected from the group consisting of the metals of Groups Ia, IIa, IIIa, IIIb, IVa, Va, and VIa of the Periodic Tables, germanium and antimony.

Hydrogenation of polymers has been conventionally accomplished by techniques which require the use of highly reactive chemicals or heterogeneous catalysts, both of which have characteristic handling and application problems. Thus, a procedure which can successfully hydrogenate polymers in the latex form without either restriction should be a significant and useful addition to the techniques now used for polymer hydrogenation. The prior art does not suggest or disclose the process of the present invention wherein carbon-carbon double bonds of an unsaturated polymer are hydrogenated through the addition of an oxidant, a reducing agent and a metal activator to the polymer in the latex form.

DISCLOSURE OF THE INVENTION

There is disclosed a process for hydrogenating carbon-carbon double bonds of an unsaturated polymer prepared from 5 to 100 percent by weight of a conjugated diene monomer unit and 95 to 0 percent by weight of ethylenically unsaturated monomer units which comprises (a) combining the unsaturated polymer in latex form with (1) an oxidant selected from the group consisting of oxygen, air and hydroperoxides; (2) a reducing agent selected from hydrazine and hydrates thereof; and (3) a metal ion activator; (b) heating the mixture to a temperature from 0° C. to the reflux temperature of the reaction mixture.

There is also disclosed a process for hydrogenating carbon-carbon double bonds of an unsaturated polymer prepared from 5 to 100 percent by weight of a conjugated diene monomer unit and 95 to 0 percent by weight of ethylenically unsaturated monomer units which comprises combining the unsaturated polymer with (1) an oxidant, (2) a reducing agent, and (3) a metal ion at a temperature from 0° C. to the reflux temperature of the reaction mixture, the improvement comprising the hydrogenation of the polymer in the aqueous or latex form.

There is further disclosed a process for hydrogenating carbon-carbon double bonds of an unsaturated polymer which comprises (a) combining the unsaturated polymer in latex form with (1) an oxidant selected from the group consisting of hydroperoxides and (2) a reducing agent selected from hydrazine and hydrates thereof; (b) heating the mixture to a temperature from 0° C. to the reflux temperature of the reaction mixture.

The process of the present invention provides a means for the hydrogenation of polymers that is highly active and which can selectively hydrogenate carbon-carbon double bonds in the main chain or side chains of the polymer. The present inventor has determined that a polymer can be hydrogenated in the latex form which is a substantial improvement over the methodologies employed in the prior art.

The unsaturated polymers useful in this invention are composed of 5 to 100% by weight of a conjugated diene monomer unit and 95 to 0% by weight of an ethylenically unsaturated monomer unit. Specific examples of the conjugated diene monomer are 1,3-butadiene, 2,3-dimethylbutadiene, isoprene and 1,3-pentadiene, specific examples of the ethylenically unsaturated monomer include unsaturated nitriles such as acrylonitrile and methacrylonitrile, monovinyl aromatic hydrocarbons such as styrene, (o-, m- and p-) alkylstyrenes, divinyl aromatic hydrocarbons such as divinylbenzene, dialkenyl aromatics such as diisopropenylbenzene, unsaturated carboxylic acids and the esters thereof such as acrylic acid, methacrylic acid, crotonic acid, itaconic acid, maleic acid, methyl acrylate, ethyl acrylate, butyl acrylate, 2-ethylhexyl acrylate and methyl methacrylate; vinylpyridine; and vinyl esters such as vinyl acetate.

The conjugated diene polymer may be one prepared by any method of preparation, such as emulsion polymerization, solution polymerization or bulk polymerization. Specific examples of the conjugated diene polymer include polyisoprene, polybutadiene, a styrene/butadiene (random or block) copolymer, an acrylonitrile/butadiene (random or blocked) copolymer, a butadiene/isoprene copolymer, and an isopreneisobutylene copolymer.

It is preferred that the polymer be prepared in an aqueous emulsion polymerization and be reduced in the latex form without prior coagulation or use of organic solvents. If the polymer to be hydrogenated is not in the latex form, then through known techniques, the polymer must be placed in an aqueous environment.

The latex form of the polymer may be hydrogenated as such. The concentration of the latex can range from 1 to 70% by weight, preferably from 1 to 40% by weight.

Any solvent which does not adversely affect the catalyst may be present in small amounts.

The hydrogenation reaction is carried out in an open or closed vessel. The reaction temperature is 0° to 300° C., preferably 20° to 150° C. Temperatures of not more than 100° C. are preferred so as to ensure selective hydrogenation and inhibit undesirable side-reactions. Pressure vessels are not required, however, pressures can range from atmospheric pressure to 300 kg/cm$^2$.

Metal ions or salts that are reduced by hydrazine are required as metal initiators in the hydrogenation reaction of the present invention except when hydroperoxides are used. A review by L. F. Audrieth and B. A. Ogg, *The Chemistry of Hydrazine*, John Wiley and Sons, Inc., New York, N.Y., 1951, discloses that many metal ions react with hydrazine and are reduced to lower valence states or to the metals themselves, depending on reaction conditions. The following list is representative of the metals whose ions or salts will react with hydrazine and are, therefore, useful in the present invention.

Antimony
Arsenic
Bismuth
Cerium
Chromium
Cobalt
Copper
Gold
Iron
Lead
Manganese
Mercury
Molybdenum
Nickel
Osmium
Palladium
Platinum
Polonium
Selenium
Silver
Tellurium
Tin
Vanadium Oxidants useful in the instant invention are oxygen, air and hydrogen peroxide. Other oxidants may be chosen from commercially available hydroperoxides. Representative hydroperoxides are cumyl hydroperoxide, t-butyl hydroperoxide, p-menthane hydroperoxide and the like. Other commercially available oxidants that are known to oxidize hydrazine are iodine, iodate, ion, hypochlorite ion, ferricyanide ion and the like.

From Example 34 it is evident that hydroperoxides, especially $H_2O_2$, do not require the presence of a metal initiation, however, use of a metal initiator will not interfer with the process of the present invention when hydroperoxides are used.

The hydrogenated polymer has excellent weatherability, ozone resistance, heat resistance and cold climate resistance, and can be used in a wide range of fields.

The process of the present invention also has the distinct advantage over the prior art in that polymers are hydrogenated without appreciable gel formation and further the prior art processes can produce environmentally unsound by-products which the process of the present invention does not.

The following Examples illustrate the present invention more specifically.

EXAMPLE 1

An open-top 1-liter glass reactor was fitted with a teflon-coated magnetic stirring bar, thermometer, gas sparging tube and a heated surface to maintain the reaction temperature. The reactor was charged with 200 ml of nitrile-butadiene rubber (NBR) latex. The NBR latex was 29 percent solids, which amounts to about 0.5 mole of rubber. The rubber may contain a polymerized or "built-in" antioxidant if so desired. The metal initiator was next charged into the glass reactor in a small amount (0.1 g $CuSO_4$), followed by 100 gms (2.0 moles) of hydrazine hydrate although anhydrous hydrazine will work. Air was charged into the stirring latex mixture via the sparge tube at 870 ml/min., and heat was applied to raise the reaction temperature to 60° C. A defoamer, which is chemically inert to the system, is often but not always needed, depending on the nature and type of latex. In this example, Nalco 2273 defoamer was added dropwise as needed over a period of 3 hours, which amounted to 11 drops. The temperature and stirring rate also have an effect on the amount of defoamer needed to contain the latex foam. After 3 hours of reaction time, the latex was filtered hot to remove the metal initiator. A portion of the filtered latex is coagulated and dried for analysis of the amount of reduction.

In this example, about 5 ml of latex is coagulated with 50 ml of isopropanol and oven-dried for 4 hours at 50°–60° C. The dried rubber was dissolved in deuterochloroform for proton analysis by nuclear magnetic resonance spectrometry (NMR), wherein the ratio of olefinic to aliphatic protons is used to determine the amount of hydrogenation of the polymer. In this example, the proton ratio as compared to unhydrogenated rubber showed a 77 percent reduction of the NBR at atmospheric pressure. Infrared spectroscopic analysis revealed the persistence of the nitrile absorption band, and no amine formation.

EXAMPLE 2

The reaction conditions of Example 1 were repeated except the molar ratio of hydrazine hydrate to NBR was lowered to 2 to 1 by using 50 g of hydrazine hydrate. The amount of carbon to carbon double bond reduction was 74 percent.

EXAMPLE 3

The reaction conditions of Example 2 were repeated except the reaction temperature was raised to 80° C. Analysis showed a 76 percent olefin reduction.

EXAMPLE 4

The reaction conditions of Example 3 were repeated except the 2 to 1 molar ratio of hydrazine to NBR was accomplished by adding anhydrous hydrazine. The rubber was reduced by 77 percent as shown by analysis.

EXAMPLE 5

The reaction conditions of Example 1 were repeated except the air flow was maintained at 490 ml/min. The analysis showed the rubber was reduced by 73 percent.

EXAMPLE 6

The reaction conditions of Example 1 were repeated except the reaction temperature was held at 80° C. The rubber was reduced by 83 percent.

EXAMPLE 7

The reaction conditions of Example 6 were repeated except the molar ratio of hydrazine to rubber was reduced to 3 to 1. Analysis showed the rubber to be 82 percent hydrogenated.

EXAMPLE 8

The conditions of Example 7 were repeated except 5 ml aliquots were taken to show that various levels of hydrogenation can be achieved by adjusting the reaction time. The following table shows the results obtained by analyzing each aliquot.

| Reaction Time (hr) | % Olefin Reduction by NMR |
|---|---|
| 0.5 | 49 |
| 1.0 | 57 |
| 1.5 | 67 |
| 2.0 | 71 |
| 2.5 | 80 |
| 3.0 | 82 |

Thus, a family of partially reduced rubbers could be produced for various applications by simply changing the reaction time, temperature, hydrazine ratio, air flow, etc.

EXAMPLE 9

An open-top 1-liter glass reactor was fitted with a teflon-coated magnetic stirring bar, thermometer, gas sparging tube and a heated surface to maintain the reaction temperature. The reactor was charged with 300 g of PBR (polybutadiene latex). The polybutadiene latex was 19 percent solids, which amounts to about 1.0 mole of rubber. A small amount of metal initiator ($CuSO_4$) was then charged into the reactor (0.1 g) followed by 75 g (1.5 moles) of hydrazine hydrate. Air was charged into the stirring reaction mixture via the sparge tube at 870 ml per minute, and the reactor was heated to 80° C. A defoamer (Nalco 2273) was added dropwise as needed to suppress foaming. A total weight of defoamer that was added over the 3 hour reaction time was 0.07 g. The latex was filtered hot to remove the metal initiator. A portion of the filtered latex was coagulated in excess isopropanol and oven dried. The rubber was dissolved in deutero-chloroform for proton analysis. Comparison of the aliphatic to the olefinic proton showed an olefin reduction of 30 percent.

EXAMPLE 10

The reaction conditions of Example 9 were repeated except the amount of hydrazine hydrate was increased to 100 g (2.0 moles). Analysis of the rubber showed a 42 percent olefinic reduction.

EXAMPLE 11

A reaction was carried out under the conditions of Example 10 except the reaction temperature was increased to 90° C. Analysis of the rubber showed the olefinic conversion remained at 41 percent.

EXAMPLE 12

A reaction was carried out under the conditions of Example 9 except the amount of hydrazine hydrate was increased to 150 g (3.0 moles). Analysis showed a 45 percent olefinic reduction.

EXAMPLE 13

A reaction was carried out under the conditions of Example 12 except the amount of metal initiator was doubled. Analysis showed no increase in olefinic reduction from the results obtained in Example 12.

EXAMPLE 14

A reaction was carried out under the conditions of Example 12 except the amount of metal initiator was cut in half. The amount of olefinic reduction was 37 percent.

EXAMPLE 15

The reaction conditions of Example 12 were repeated except the reaction temperature was held at 70° C. Analysis showed an olefinic reduction of 30 percent.

EXAMPLE 16

The reaction conditions of Example 12 were repeated except the reaction mixture was diluted with 150 ml of water. Analysis showed an olefinic reduction of 62 percent.

EXAMPLE 17

A reaction was carried out under the conditions of Example 16 except the amount of hydrazine hydrate was lowered to 75 g (1.5 moles) and the latex to 150 g. The amount of olefinic reduction was shown to be 54 percent.

EXAMPLE 18

A reaction was carried out under the conditions of Example 16 except the amount of added water was increased to 300 g and the latex lowered to 150 g. Analysis of the rubber showed an olefinic reduction of 68 percent.

EXAMPLE 19

The reaction conditions of Example 12 were followed except the amount of latex was reduced to 150 g, and 150 g of water was added. Analysis of the rubber showed an olefinic reduction of 45 percent.

EXAMPLE 20

An open-top 1-liter glass reactor was fitted with a teflon-coated magnetic stirring bar, thermometer, gas sparging tube and a heated surface to maintain the reaction temperature. The reactor was charged with 200 ml of SBR (styrene/butadiene) latex which is 20 percent solids and represents less than 1.0 mole of rubber. The CuSO$_4$ metal initiator (0.1 g) was added, followed by 75 g of hydrazine hydrate (1.5 moles). Air was charged into the stirring reaction mixture via the sparge tube at 870 ml per minute, and the reactor was heated to 80° C. Nalco 2273 defoamer was added dropwise as needed. A total weight of defoamer that was added over the 3 hours reaction time was 0.10 g. The latex was filtered hot to remove the metal initiator. A portion of the filtered latex was coagulated in excess isopropanol and oven dried. The rubber was dissolved in deuterochloroform for proton analysis. Comparison of the aliphatic to the olefinic protons showed an olefin reduction of 65 percent. This reaction was repeated twice and a 62 percent olefin reduction was observed in both runs.

EXAMPLE 21

The reaction conditions of Example 20 were repeated except the amount of hydrazine hydrate was increased to 100 g (4.0 moles). Analysis showed an olefinic reduction of 69 percent.

EXAMPLE 22

A reaction was carried out under the conditions of Example 1 except natural rubber (NR) latex was used under the following conditions. The NR latex is 62 percent solids and was diluted for ease of stirring. Fifty milliliters of the NR latex was charged into the reaction vessel along with 150 ml of water, followed by 0.1 g of CuSO$_4$ initiator and 75 g of hydrazine hydrate. Air was charged into the reaction mixture at 870 ml per min. and the reactor was heated to 90° C. A total amount of Nalco 2273 defoamer added during the 3 hour run was 0.14 g. Work up and analysis of the rubber showed a 20 percent olefinic reduction.

EXAMPLE 23

The reaction conditions of Example 22 were repeated except 70 ml of the NR latex was charged into the reactor along with 130 ml of water. Analysis showed a 26 percent olefinic reduction.

EXAMPLE 24

The reaction conditions of Example 23 were repeated except the reaction mixture was heated to 100° C. for 3 hours. Analysis showed a 27 percent reduction of the olefinic double bonds.

EXAMPLE 25

The reaction conditions of Example 1 were repeated except the NBR latex was dissolved in pyridine prior to addition to the reactor. Twelve milliliters of NBR latex was dissolved in 200 ml of pyridine and charged into the reactor, followed by 12 g of hydrazine hydrate and 0.1 g CUSO$_4$ initiator. Work-up and analysis showed an 82 percent olefinic reduction.

EXAMPLE 26

A reaction was carried out under the conditions of Example 25 except diglyme (diethylene glycol dimethyl ether) was used as the solvent. Analysis also showed an 82 percent olefinic reduction.

EXAMPLE 27

The reaction conditions of Example 26 were repeated except cellosolve (2-ethyoxyethanol) acetate was used as the solvent. Analysis showed a 50 percent olefinic reduction.

EXAMPLE 28

The reaction conditions of Example 26 were repeated except morpholine was used as the solvent. All of the rubber became completely insoluble and gelled.

EXAMPLE 29

The reaction conditions of Example 28 were repeated except a reaction temperature of 50° C. was used. Analysis showed a 26 percent olefinic reduction.

EXAMPLE 30

The reaction conditions of Example 26 were repeated except tetrahydrofuran (THF) was used as the solvent at 50° C. An olefinic reduction of 30 percent was observed.

EXAMPLE 31

A reaction was carried out under the conditions of Example 1 except hydrogen peroxide was used as the oxidant. The glass reactor was charged with 200 ml (ca. 0.5 mole) of NBR latex, 0.10 g of CuSO$_4$ initiator and 75 g (1.5 moles) of hydrazine hydrate. The reaction mixture was stirred as 30 percent hydrogen peroxide was added dropwise at room temperature. The exothermic nature of the reaction quickly heated the reaction mixture to 50°-55° C. The reaction temperature was held at 50°-55° C. by adjusting the drop rate of the hydrogen peroxide. A total of 54 g of 30 percent hydrogen peroxide was added in the 2½ hour reaction time. This amounts to about 0.5 mole of hydrogen peroxide. Aliquots of the reaction mixture (ca. 2 ml) were taken every one-half hour and coagulated, dried and analyzed by NMR. The following Table shows that the amount of olefin reduction can be controlled by the amount of oxidant added:

| Reaction Time (hr) | Total Amount of Hydrogen Peroxide Added (g) | % Olefin Reduction by NMR |
|---|---|---|
| 0.5 | 10 | 18 |
| 1.0 | 19 | 22 |
| 1.5 | 28 | 24 |
| 2.0 | 39 | 33 |
| 2.5 | 54 | 47 |

Additional peroxide would give a higher reduction of the olefinic double bonds.

EXAMPLE 32

A reaction was carried out under the conditions of Example 25 except the reaction of hydrazine, metal initiator and air was remote from the NBR latex-pyridine solution. Two 500 ml glass reactors were set up in close proximity to each other for ease of transferring the oxidized hydrazine solution to the NBR solution. The first reactor (A) contained 12 ml of NBR latex dissolved in 200 ml of pyridine, which was heated to 60° C. with stirring. The second reactor (B) contained 12 g of hydrazine hydrate dissolved in 200 ml of pyridine, 0.1 g of CuSO$_4$ initiator and air sparge tube. Reactor B is heated to 45° C. with stirring and air is sparged into the reaction mixture at 870 ml/min. After 15 minutes of sparging reactor B with air, a 25 ml aliquot of the solution is quickly transferred to reactor A which is maintained at 60° C. with stirring. A 25 ml aliquot is transferred every 15 minutes until reactor B is empty. The contents of reactor A are continually stirred at 60° C. for a total of 3 hours reaction time. Work-up and analysis of the NBR showed no reduction of the olefin.

EXAMPLE 33

A reaction was carried out under the conditions of Example 31 except 0.1 g of $FeSO_4$ was added as the metal initiator. After 2½ hours of reaction time with 10 g of 30 percent hydrogen peroxide being added each one-half hour (dropwise) for a total of 50 g $H_2O_2$, the mixture was worked up and NMR analysis showed a 54 percent reduction in the olefinic bonds.

EXAMPLE 34

A reaction was carried out under the conditions of Example 31 except no metal initiator was charged to the reaction mixture. After 3½ hours of reaction time with 10 g of 30 percent hydrogen peroxide being added each one-half hour (dropwise) for a total of 70 g $H_2O_2$, the mixture was worked up and NMR analysis showed a 66 percent reduction in the olefinic double bonds.

EXAMPLE 35

A reaction was carried out under the conditions of Example 1 except the metal initiator was left out of the reaction. After 3 hours of reaction time at 60° C., the latex rubber was coagulated, worked up and dried. NMR analysis of the NBR rubber showed no olefinic reduction.

EXAMPLE 36

A reaction was carried out under the conditions of Example 1 except the metal initiator was left out of the reaction and the system was heated to 90° C. for 3 hours. NMR analysis showed no appreciable reduction within the experimental error of the analytical method.

While certain representative embodiments and details have been shown for the purpose of illustrating the invention, it will be apparent to those skilled in this art that various changes and modifications may be made therein without departing from the scope of the invention.

I claim:

1. A process for hydrogenating carbon-carbon double bonds of an unsaturated polymer prepared from 5 to 100 percent by weight of a conjugated diene monomer unit and 95 to 0 percent by weight of ethylenically unsaturated monomer units which comprises (a) combining the unsaturated polymer in latex form with (1) an oxidant selected from the group consisting of oxygen, air and hydroperoxides; (2) a reducing agent selected from hydrazine and hydrates thereof; and (3) a metal ion activator; (b) heating the mixture to a temperature from 0° C. to the reflux temperature of the reaction mixture.

2. A process according to claim 1 wherein the unsaturated polymer is selected from the group comprising polyisoprene, polybutadiene, styrene/butadiene copolymers, acrylonitrile/butadiene copolymers, butadiene/isoprene copolymers, isoprene/isobutylene copolymers and natural rubber.

3. A process according to claim 1 wherein the concentration of unsaturated polymer in latex form is from 1 to 70% by weight.

4. A process according to claim 1 wherein the reaction temperature is from 20° C. to 150° C.

5. A process according to claim 1 wherein the oxidant is hydrogen peroxide.

6. A process according to claim 1 wherein the metal ion activator is a salt of a metal selected from the group consisting of copper, iron, cobalt, lead, nickel, silver and tin.

7. A process for hydrogenating carbon-carbon double bonds of an unsaturated polymer prepared from 5 to 100 percent by weight of a conjugated diene monomer unit and 95 to 0 percent by weight of ethylenically unsaturated monomer units which comprises combining the unsaturated polymer with (1) an oxidant, (2) a reducing agent, and (3) a metal ion at a temperature from 0° C. to the reflux temperature of the reaction mixture, the improvement comprising the hydrogenation of the polymer in the aqueous or latex form.

8. A process according to claim 7 wherein the unsaturated polymer is selected from the group comprising polyisoprene, polybutadiene, styrene/butadiene copolymers, acrylonitrile/butadiene copolymers, butadiene/isoprene copolymers, isoprene/isobutylene copolymers and natural rubber.

9. A process according to claim 7 wherein the concentration of polymer in latex form is from 1 to 70% by weight.

10. A process according to claim 7 wherein the reaction temperature is from 20° C. to 150° C.

11. A process according to claim 7 wherein the oxidant is hydrogen peroxide.

12. A process according to claim 7 wherein the metal salt activator is the salt of a metal selected from the group consisting of copper, iron, cobalt, lead, nickel, silver and tin.

13. A process for hydrogenating carbon-carbon double bonds of an unsaturated polymer which comprises (a) combining the unsaturated polymer in latex form with (a) an oxidant selected from the group consisting of hydroperoxides and (2) a reducing agent selected from hydrazine and hydrates thereof; (b) heating the mixture to a temperature from 0° C. to the reflux temperature of the reaction mixture.

14. A process according to claim 13 wherein the concentration of unsaturated polymer in latex form is from 1 to 70% by weight.

15. A process according to claim 13 wherein the reaction temperature is from 20° C. to 150° C.

* * * * *